United States Patent
McDonald et al.

(10) Patent No.: US 8,577,221 B2
(45) Date of Patent: Nov. 5, 2013

(54) SWITCH SYSTEM AND METHOD FOR THE MONITORING OF VIRTUAL OPTICAL PATHS IN AN OPTICAL BURST SWITCHED (OBS) COMMUNICATION NETWORK

(75) Inventors: David McDonald, Dublin (IE); Tom Farrell, Dublin (IE); Jim Shields, Dublin (IE); John Courtney, Dublin (IE)

(73) Assignee: Intune Networks Limited, Dublin (IE)

(*) Notice: Subject to any disclaimer, the term of this patent is extended or adjusted under 35 U.S.C. 154(b) by 0 days.

(21) Appl. No.: 13/509,533

(22) PCT Filed: Nov. 12, 2010

(86) PCT No.: PCT/EP2010/067377
§ 371 (c)(1),
(2), (4) Date: Jul. 18, 2012

(87) PCT Pub. No.: WO2011/058135
PCT Pub. Date: May 19, 2011

(65) Prior Publication Data
US 2012/0275781 A1    Nov. 1, 2012

Related U.S. Application Data

(60) Provisional application No. 61/260,584, filed on Nov. 12, 2009.

(30) Foreign Application Priority Data

Nov. 12, 2009 (EP) .................................... 09175742

(51) Int. Cl.
*H04B 17/00* (2006.01)
*H04J 14/00* (2006.01)
*H04J 14/02* (2006.01)

(52) U.S. Cl.
CPC .................................. *H04J 14/0227* (2013.01)
USPC ............................................... 398/25; 398/59

(58) Field of Classification Search
USPC ................................................ 398/25, 58, 59
See application file for complete search history.

(56) References Cited

U.S. PATENT DOCUMENTS 5,727,051 A * 3/1998 Holender .................. 379/112.05
2005/0177749 A1 * 8/2005 Ovadia .......................... 713/201

FOREIGN PATENT DOCUMENTS

GB          2354905          4/2001

OTHER PUBLICATIONS

Alan M. Hill et al., "*Multiple-Star Wavelength-Router Network and Its Protection Strategy*", IEEE Journal on Selected Areas in Communications, Sep. 1, 1998, vol. 16, No. 7.

*Primary Examiner* — Dalzid Singh
(74) *Attorney, Agent, or Firm* — Occhiuti & Rohlicek LLP (57) ABSTRACT

The invention provides an optical burst switch in an Optical Burst Switched (OBS) communication network, said optical burst switch comprising means for monitoring and maintaining mesh of virtual optical paths from a communication node to a plurality of other communication nodes, arranged in a ring network, enabling traffic data to be transmitted and/or received between nodes via a physical optical path. The switch also provides means for sending a data packet probe on a virtual path from a node to each other node in the OBS communication network, wherein data packet probe information received at said switch provides information of availability of the physical optical path for sending traffic data between nodes. The switch can be configured such that the rate at which this path monitoring is scheduled guaranteeing less than 50 ms protection switch in the event of monitoring a failed or degraded path.

22 Claims, 4 Drawing Sheets

SWITCH SYSTEM AND METHOD FOR THE MONITORING OF VIRTUAL OPTICAL PATHS IN AN OPTICAL BURST SWITCHED (OBS) COMMUNICATION NETWORK

FIELD OF THE INVENTION

The invention relates to the monitoring of the presence of a communication channel or optical paths in a wavelength addressed optical burst switched communications network.

BACKGROUND TO THE INVENTION

There are many layers associated with the provisioning of a high availability, robust and scalable telecommunications infrastructure. The switching and transport of the information are two of the atomic functions that such networks need to support, in order for efficient service delivery over large geographical distances. These functions have traditionally been provided using a separate switching (Ethernet silicon switch, ATM switch, SDH cross connect etc.) and a high bandwidth point to point transport pipe (e.g. 10 and 40 G WDM and DWDM technologies).

With the advent of tunable lasers as a displacement technology for traditional distributed feedback lasers, the ability to support flexible optical circuits has allowed a more dynamic and provision centric means of provisioning physical channels within known fibre capacities. Indeed, in next generation optical burst switched (OBS) networks the ability to provide optical packet switch and transport (OPST) capability has emerged as a means of efficient and effective switching and transportation of information between virtually connected endpoints in an optical transmission network, such networks usually adopting a ring topology and wavelength addressed burst. In such a configuration, a physically connected ring constitutes a distributed switch where the wavelength of the light launched from the source lasers creates a virtual path between the ports of said virtual switch. A recent paper entitled "The Optical Switching Revival: Rebuilding Optical Networks for Packets", Heavy Reading, Vol. 7, N. 3, March 2009 discloses this virtual switch concept and where the next generation optical burst switched (OBS) networks is heading towards.

Traditional circuit switched telecommunication systems operate on the basis of fixed dedicated communication channels being available permanently for the launching and reception of information. The integrity of such communication paths are monitored in a number of different schemes, for example, SONET\SDH has J0,J1,J2, which are used to generate TIM Trace Identifier Mismatch, telecommunications standard G709 which has Trail Trace Identifier (TTI); IP\MPLS has Bidirectional Forwarding Detection—BFD and/or Ethernet has emergent 802.1ag\Y1731. In these schemes quanta of information are launched, via specific probe packets, into the system as a means of ensuring continuity of the channel for information exchange purposes, where the channel in this instance is a messaging or higher level entity for continuity and connectivity checking between higher level communicating functions embedded within terminal devices of the network.

OBS communication networks, in the general case, access the physical channel in an asynchronous temporal manner. That is to say, access to the communication channel is not aligned to any system timing boundary and where such access is derived by the dynamic traffic load. Due to the highly aperiodic nature of the proposed access mechanism to the physical transport infrastructure, in true OBS networks, there is a need to ensure that the high level control functions of the network have visibility as to the condition of the physical plant on a continuous basis so that it is fully aware of all link and path availability before using such infrastructure. In an asynchronous OBS network, where there may be long periods of inactivity before a given path in the network is used, it is a critical need for the high availability of the system that silent failures do not occur and that asynchronous, aperiodic, OBS paths are probed on a time bounded basis. A silent failure refers to the situation where a failure of the path is not detected through the loss of data, due to the potentially long periods of inactivity on an OBS path. Without such a deterministic mechanism, as proposed, any OBS based transmission network is prone to silent failure events and to less than adequate resiliency for carrier class deployment.

Optical communication systems based on Dense Wavelength Decision Multiplex technology exhibits wavelength dependent performance. In wavelength addressed optical burst networks, services that overlay such infrastructure require that all wavelengths within the networks maintain a minimum level of performance so as to ensure that the overall virtual switch paths remain colourless. Colourless operation referring to the wavelength independent nature of each path in such a virtual switch, i.e. any colour can be assigned to perform the data carting task on any path of the switch. Each path is assigned a specific wavelength, with each node or switch in the network is configured to transmit/receive a particular wavelength.

Typically in a ring network data is scheduled onto such virtual wavelength addressed switches in an asynchronous fashion so that all nodes have fair access to the switch fabric. The path monitoring function is performed at the highest scheduled priority level and in a periodic manner, by default. This type of scheduling is disclosed by PCT Patent Publication Number WO2004040722, filed by the same applicant as the present application, Intune Networks Limited.

There is therefore a need to provide physical path monitoring of virtual paths in optical burst switched networks, so as to provide a highly available network infrastructure for delivery of flexible network services, which overcomes the above mentioned problems associated with OBS networks.

SUMMARY OF THE INVENTION

According to the present invention there is provided, as set out in the appended claims, an optical burst switch in an Optical Burst Switched (OBS) communication network, said optical burst switch comprising:
  means for monitoring and maintaining mesh of virtual optical paths from a communication node to a plurality of other communication nodes, arranged in a ring network, enabling traffic data to be transmitted and/or received between nodes via a physical optical path; and
  means for sending a data packet probe on a virtual path from a node to each other node in the OBS communication network, wherein data packet probe information received at said switch provides information of availability of the physical optical path for sending traffic data between nodes.

The network employs the periodic launching and/or reception of high priority asynchronous temporally confined bursts of information which probes the physical channel and provides a guarantee of availability of the physical optical path in virtual optical circuits, as found in optical burst switched networks. The invention is particularly applicable to communication networks that employ optical wavelength division multiplexing temporal bursts and source wavelength addressing to the destination for realising full N×N virtual switch paths in ring topology networks.

In one embodiment the data packet probe is sent using a periodic launching and reception of high priority asynchronous temporally confined bursts of information.

In one embodiment said probe information is provided at the source side of the virtual switch to allow for source side protection switching.

In one embodiment the virtual paths are formed by the tuning of wavelengths of a source laser comprising a N×N fully meshed switch formed by such paths.

In one embodiment the physical path monitoring function is in-band with a wavelength addressed optical burst and comprises a monitoring capability along the whole burst path.

In one embodiment the insertion and filtering of highest priority packets of data are periodically scheduled onto the virtual switch is determined based on data packet probe information.

In one embodiment the invention comprises a second ring network to provide a bi-directional ring topology.

In one embodiment the switch comprises means of scheduling highest priority maintenance messages over a distributed optical switching fabric, where the fabric switch is based on tuning the wavelength of a source tunable laser; and a protection mechanism allowing bi-directional path switching to occur within specified time bounds, if a fault is detected on one ring.

In one embodiment each logical port of the virtual switch comprises a view of the full connectivity available to it for the forwarding of data.

In one embodiment each data packet probe comprises a unique identifier.

In one embodiment the data packet probe comprises at least one parameter of quantitative information of the availability of the physical optical path between nodes before sending data over from one node to another node.

In one embodiment the quantitative information comprises one or more of the following parameters: optical received power; Error rate; operations and instrumentation data pertaining to the current or a previously probed virtual path; provides a means of messaging high priority information through the data plane via a so called "clear" channel; and/or slow physical channel degradation.

In one embodiment said switch comprises a plurality of logical ports, each logical port of the distributed switch gathers a virtual path maintenance vector, in a periodic manner, for the distributed switch and means for generating a virtual path maintenance matrix for a full N×N virtual switch, wherein said matrix is a combination of all logical port vectors.

In one embodiment each maintenance vector comprises of a binary connectivity path map between each source and each destination of the switch, as addressed on the basis of source burst wavelength, where each entry is either 0 (no path available) or 1 (path available).

In one embodiment there is provided a physical path monitoring function is in-band with the wavelength addressed optical burst and comprises a monitoring capability along the whole burst path.

In one embodiment there is provided means for providing fair access to each of the virtual paths is maintained by a distributed scheduling system, wherein said scheduling system guarantees delay and jitter bounds on the data packet probes of information inserted into the virtual paths for path maintenance.

In one embodiment there is provided means for defining the order in which the scanning is to be performed by said data packet probes.

In one embodiment the scanning order is dependent on the basis of the priority and the loading of traffic between ports of a switch.

In one embodiment said probe wavelength addressed packets probe other optical paths of the system with periodically deterministically sourced packets, ensuring detection of "silent" failures in such non data plane paths. Such non data plane paths being paths that have yet to come into service.

In a further embodiment of the present invention there is provided a method for sending and/or receiving data in an Optical Burst Switched (OBS) optical network comprising the steps of:
monitoring and maintaining mesh of virtual optical paths from a communication node to a plurality of other communication nodes, arranged in a ring network, enabling traffic data to be transmitted and/or received between nodes via a physical optical path; and
sending a data packet probe on a virtual path from a node to each other node in the OBS communication network, wherein data packet probe information received at a switch provides information of availability of the physical optical path for sending traffic data between nodes In a further embodiment there is provided an optical switch in an optical communication network, said optical switch comprising:
means for monitoring and maintaining mesh of virtual optical paths from a communication node to a plurality of other communication nodes enabling traffic data to be transmitted and/or received between nodes via a physical optical path; and
means for sending a data packet probe on a virtual path from a node to each other node in the OBS communication network, wherein data packet probe information received at said switch provides information of availability of the physical optical path for sending traffic data between nodes.

In another embodiment there is provided an optical burst switch in an Optical Burst Switched (OBS) communication network, said optical burst switch comprising:
means for monitoring and maintaining a mesh of virtual optical paths from a communication node to a plurality of other communication nodes, enabling traffic data to be transmitted and/or received between nodes via a physical optical path; and
means for sending a data packet probe on a virtual path from a node to each other node in the OBS communication network, wherein data packet probe information received at said switch provides information of availability of the physical optical path for sending traffic data between nodes.

In a further embodiment there is provided a controller for an optical burst switch in an Optical Burst Switched (OBS) communication network, said controller comprising:
means for monitoring and maintaining a mesh of virtual optical paths from a communication node to a plurality of other communication nodes, enabling traffic data to be transmitted and/or received between nodes via a physical optical path; and
means for sending a data packet probe on a virtual path from a node to each other node in the OBS communication network, wherein data packet probe information received at said switch provides information of availability of the physical optical path for sending traffic data between nodes.

There is also provided a substantially fast autonomous programmable hardware logic system, which is further configurable via a slower computer program, which merges/filters the probe packets with/from the main data path, said programs which implement this method may be embodied on a suitable recorded medium or read only memory.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 1:
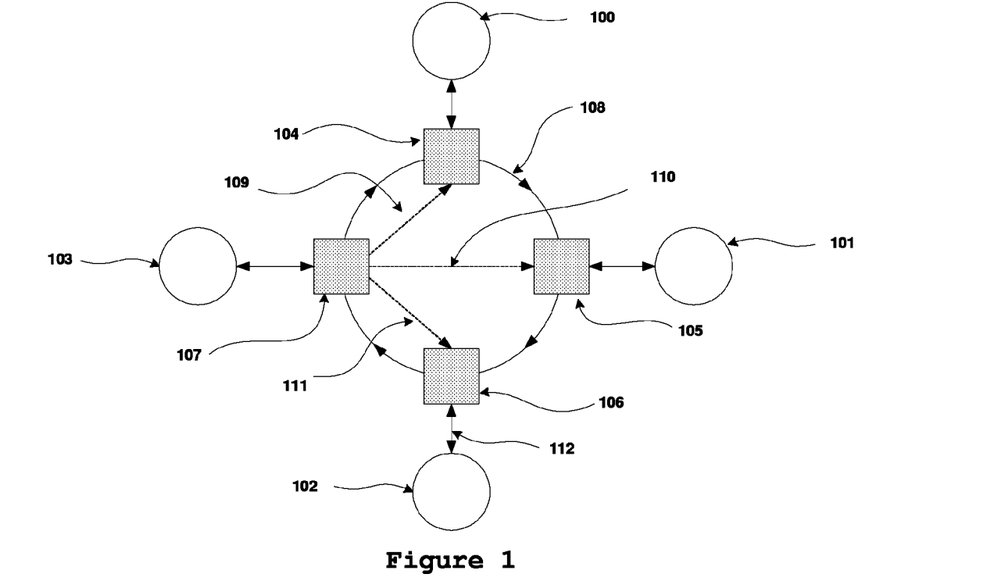
FIG. 1 illustrates a known optical ring communication network architecture using source wavelength switching and a ring topology.

Referring now to the drawings and initially FIG. 1, there is illustrated a known optical ring communication network architecture comprising a number of external network interfaces 100, 101, 102, 103 connected to a number of ports 104, 105, 106 and 107, where these preferably contain a fast tunable laser which is wavelength switched to address a given destination port, arranged in the ring network. The ports 104, 105, 106 and 107 are connected by a physical optical path link 108, for example using an optical fibre, in a clockwise fashion from transmitter to receiver. Each of the ports 104, 105, 106 and 107 can communicate with each other over wavelength addressed optical virtual paths. By way of example, paths 109, 110 and 111 are the paths set up between 107 to 104; 107 to 105; and 107 to 106 on the basis of different burst wavelengths transmitted from a fast tunable laser, present in 107.

Figure 2:
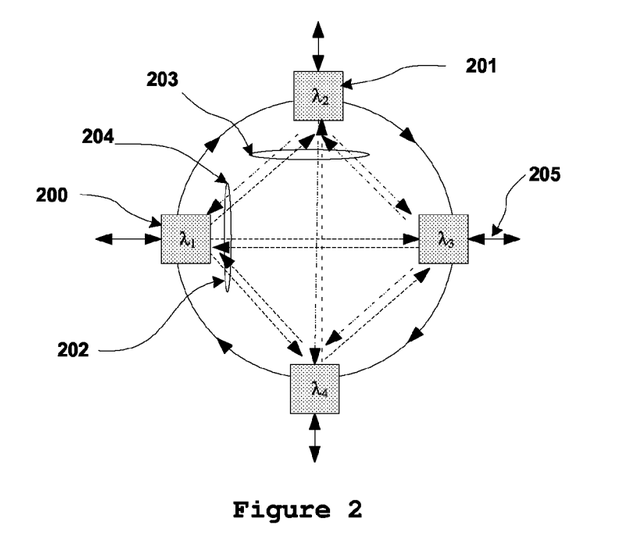
FIG. 2 illustrates a distributed wavelength addressed switch in an optical ring network showing virtual and physical paths.

Referring to FIG. 2 illustrates a number of such ports 200 and 201 on a ring architecture where all the logical virtual switch meshed paths that can be supported on such a distributed wavelength addressed switch (four ports in this case) are shown by the dotted lines. 203 and 204 encircle the group of virtual paths that are transmitted from, or received by 201 and 200 respectively. In the example shown $\lambda_1$, and $\lambda_2$ have been assigned to receive side of 200 and 201 so that only these wavelengths are dropped to the receivers in each of these. All other wavelengths pass through 200 and 201 respectively, so that all traffic bursts from one port to another port in the switch "virtually" go directly to the correct wavelength assigned receive port. This is what constitutes a virtual path in the distributed switch.

Figure 3:
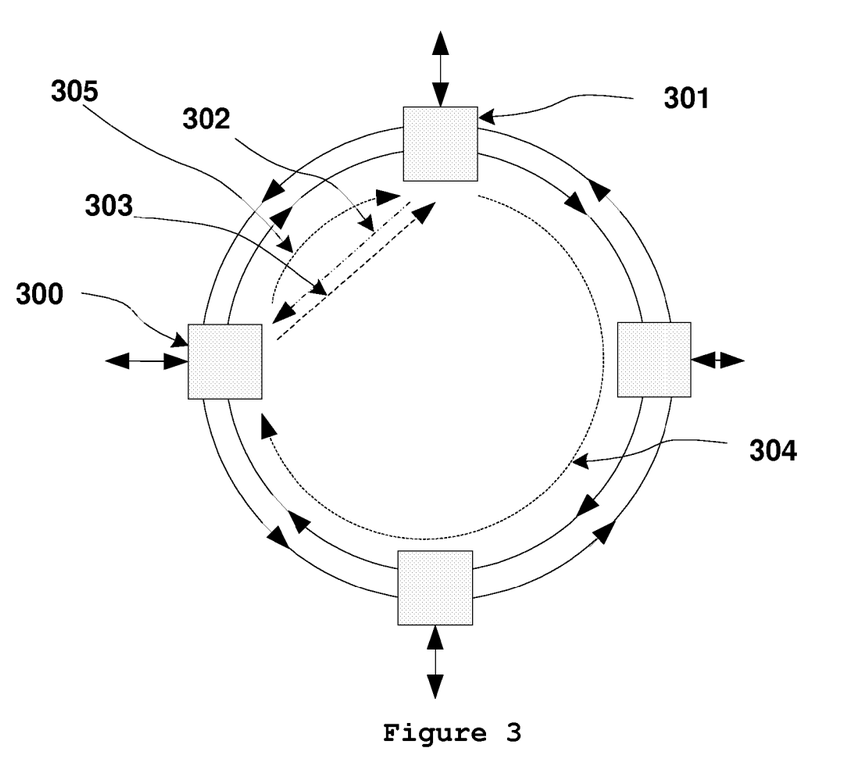
FIG. 3 illustrates the virtual and physical paths probed in a bi-directional ring network architecture.
Figure 4:
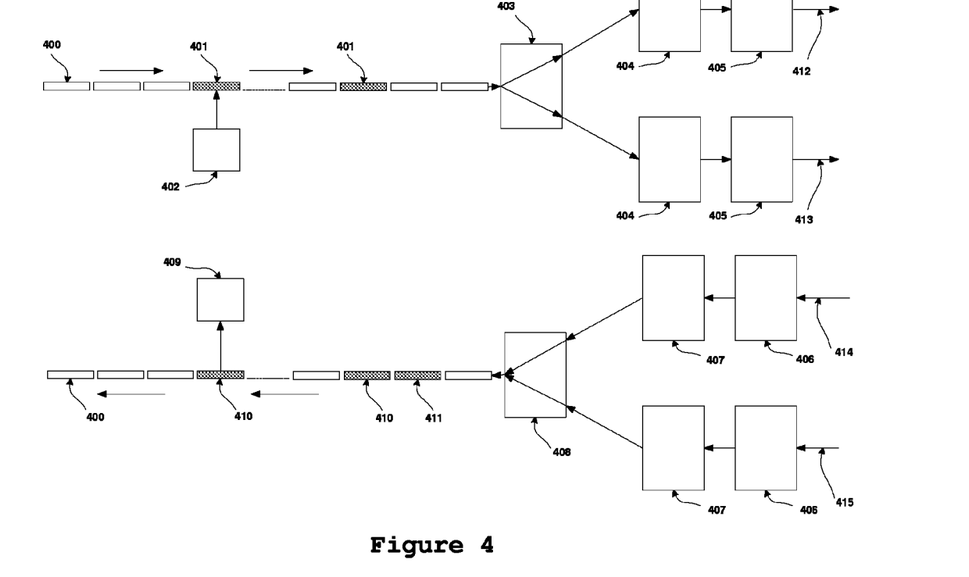
FIG. 4 illustrates the operation of a switch in an optical ring network utilising virtual and physical paths according to the invention.

Referring to FIGS. 3 and 4, FIG. 3 illustrates an optical burst switched network having a bi-directional ring topology. FIG. 4 illustrates the architecture of an optical burst switch in an optical ring network utilising virtual and physical paths according to the invention. The optical burst switch controls a mesh of virtual optical paths from a node to a plurality of other communication nodes, arranged in a ring network, as shown in FIG. 2 or 3, enabling data to be transmitted and/or received between nodes via the physical optical path.

In operation, the switch merges a data packet probe 401 from an optical module 402 (watchdog) with client service packet data, 400. This data is forwarded via a switch to a wavelength assignment block 404 and onward to the fast tunable laser, 405, which launches the temporally confined burst onto the optical fibre 412 or 413, in the case of a bi-directional protection ring configuration. On a periodic basis said 401 probe packets are forwarded, assigned different wavelengths (404) for the different virtual ports of the switch and transmitted.

Referring to the lower part of FIG. 4, detection of a failed virtual path can be obtained from the data packet probe, by virtue of a physical link failure or degraded communications channel (for example increased bit error counts). This is gathered in a manner at the source side of each virtual path, allowing source side protection switching to be supported at the physical path level, wherein data from a failed path in a ring network, is forward to the protected path in a bidirectional path switch ring configuration. In other words the data packet probe information 410 and 411 launched from other nodes in the network received at the switch provides information of availability of the physical optical path for sending data between nodes. Effectively the data packet probe 401 provides a mechanism to transport equivalent means of managing fibre infrastructure and gets away from higher layers in the network, which maintains or monitors end point to end point connectivity. The data packet probes can be configured to contain parameters such as, but not limited to, optical continuity, optical power loss, correct addressing, burst loss such that correct optical tuning can be determined.

Each physical optical path is used by data traffic when the needs of the client service require forwarding between the ports through the optical path. Each node/port comprises a special traffic generator and detector is provided such that each node transmits traffic to all other nodes independent from the client traffic flows and all nodes receive special traffic from all other nodes independent from the client traffic flows. The operation of the switch 200, 201 is described in more detail below.

Unlike the case where a separate optical channel is used to monitor and detect link failure or degradation, the current path monitoring function is in-band with the wavelength addressed optical burst and has a monitoring capability along the whole burst path (electrical and optical).

By way of example, referring to FIGS. 3 and 4, the virtual paths can be scanned in a node by node fashion clockwise, or anti clockwise around a physical ring (linearly port by port in the equivalent virtual switch) within a time bounded cycle time so as to ensure that the paths are available to ensure 50 ms protection switching capability of protected, in the event of path failure. The time between when such virtual path maintenance packets are scheduled onto the switch fabric is such so as to ensure that all source-destination signalling can ensure 50 ms service outage metrics, for a given virtual switch scale. For the example of an eighty port (80 lambda) switch the scan time for 80 such path maintenance packets is preferably 5 ms.

The above scanning mechanism is completely autonomous and independent of what the port to port traffic loadings are and persists during period of zero loading, ensuring detection of "silent" failures. An additional advantage of this scan mechanism between the virtual switch ports is that the order, the port set size and the rate of the scanning is fully programmable, with such parameters being able to be set on the basis of different parameters within the virtual switch (e.g. lightly loaded ports may be scanned at a slower rate) itself. This allows for an increased rate of detection capability on the basis of heavy traffic loading between ports or traffic priority.

Figure 5:
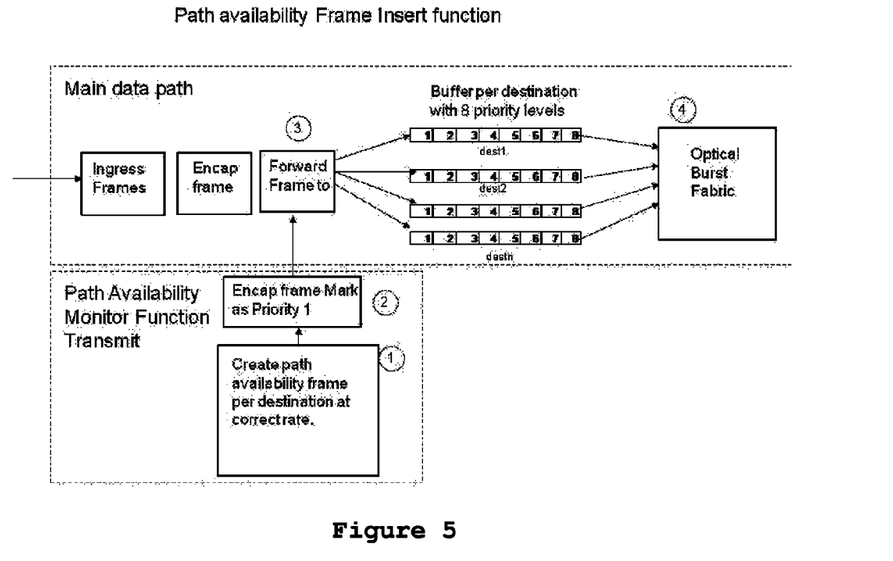
FIGS. 5 and 6 shows a flow chart illustrating the path availability for each probe.
Figure 6:
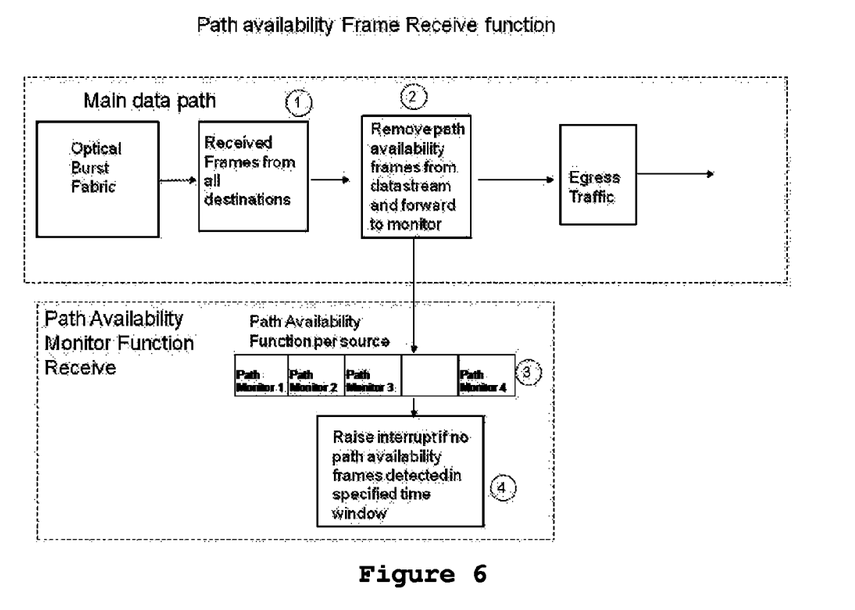

Referring to FIGS. 5 and 6 there is illustrated a flow chart illustrating the path availability for each probe. The flow charts outlines the logic on the ingress and egress sides of each path (i.e. at the transmit and receive sides) and the closure of these for source side switching.

In FIG. 5 the steps are as follows at the transmit side:
1. Create frame by creating path availability frame per destination at correct error rate.
2. Label frame for data path and mark as Priority 1.
3. Merge frame into data path and buffer for correct destination at correct priority.
4. Path availability frame forwarded over Burst fabric to destination node.

In FIG. 6 the steps are as follows at the receive side:
1. Frames received from all sources or destinations.
2. Detect Path availability frames in DataStream and forward to monitor function.
3. Path monitor function exists per source sending traffic to this destination.
4. Interrupt raised to system when path availability is lost.

Figure 7:
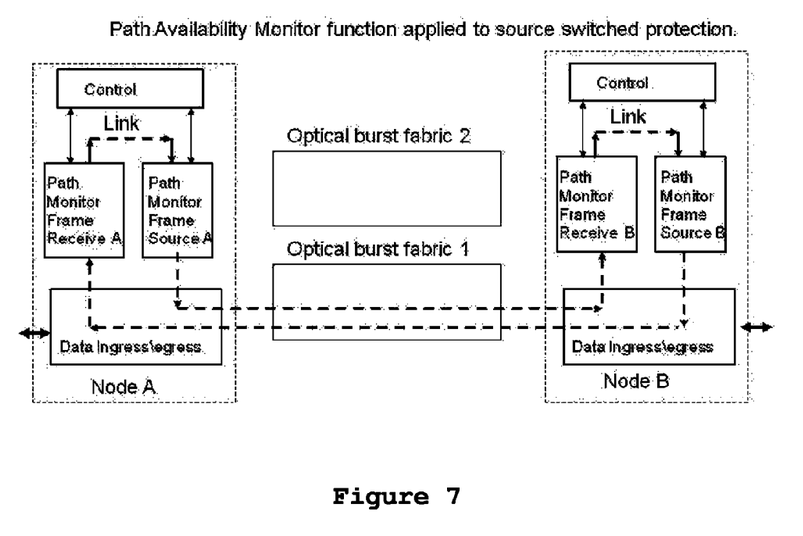
FIG. 7 illustrates one embodiment showing how the path availability monitor function can be applied to source switched protection.

FIG. 7 illustrates how the path availability monitor function is applied to source switched protection. The application shows the link between receive monitor and transmit path function on each node. The transmitted path availability frames from A to B indicate to B if the path availability frames sourced by B were received by A. Node B consequently has information on the path availability from Node B to Node A and can use this as the basis of protection switching i.e. uses a second optical burst fabric.

It will be appreciated the method for the monitoring of the physical paths, for failure or degradation, of a distributed packet switch formed by a mesh of virtual paths provides a full N×N mesh connectivity between the nodes on the basis of the burst wavelength. The switch allow for the insertion and filtering of highest priority packets that are periodically scheduled onto the virtual switch, which provide a means of path failure or degradation, even in the case where no traffic is forwarded over said virtual paths. The path maintenance information at the source side of the switch allows for source side protection switching.

The switch employs the periodic launch and reception of high priority asynchronous temporally confined bursts of information which probes the physical channel and provides a guarantee of availability of the physical optical path in virtual optical circuits, as found in optical burst switched networks. The invention is particularly applicable to communication networks that employ optical wavelength division multiplexing temporal bursts and source wavelength addressing to the destination for realising full N×N virtual switch paths in ring topology networks.

The path monitoring function can be performed by way of scheduling highest priority packets over a wavelength addressed optical burst switched network having a bi-directional ring topology, the operation of which is discussed in more detail below.

It will be appreciated that the embodiments, the data packet probes have the capability to provide a free channel of bandwidth for communications over, such that the probes can be used for control information in the case of control channel failures.

Scheduling of the highest priority maintenance messages over a distributed optical switching fabric, where the fabric switch is based on tuning the wavelength of a source tunable laser comprising of:
- two planes, where the method signal to a protection mechanism allowing bi-directional path switching to occur within specified time bounds; and
- each logical port of the distributed switch has a view of the full connectivity available to it for the forwarding of data.

Each port of the distributed switch autonomously gathers the virtual path maintenance vector itself, in a periodic manner, for the distributed switch and that the virtual path maintenance matrix for the full N×N switch is the combination of all the logical port vectors. The maintenance vector consists of the binary connectivity path map between each source and each destination of the switch, as addressed on the basis of source burst wavelength, where each entry is either 0 (no path available) or 1 (path available).

By way of example, below is a virtual path connectivity matrix, where the rows indicate the source (transmit) and the columns the destination (receive) of the switch, where each destination port is wavelength specific. The 1 entry in the (S1,D1) position indicates a transmit communicating with itself, i.e. loopback. With reference to the four port distributed switch of FIG. 2, where all optical paths are available, can be represented by the following matrix:

|    | D1 | D2 | D3 | D4 |
|----|----|----|----|----|
| S1 | 1  | 1  | 1  | 1  |
| S2 | 1  | 1  | 1  | 1  |
| S3 | 1  | 1  | 1  | 1  |
| S4 | 1  | 1  | 1  | 1  |

In the case where there has been a failure of the path between ports 2 and 3, the resultant path connectivity matrix is:

|    | D1 | D2 | D3 | D4 |
|----|----|----|----|----|
| S1 | 0  | 1  | 0  | 0  |
| S2 | 0  | 0  | 0  | 0  |
| S3 | 1  | 1  | 0  | 1  |
| S4 | 1  | 1  | 0  | 0  |

Fair access to each of the virtual paths is maintained by a distributed scheduling system. Such scheduling system is realised so as to guarantee delay and jitter bounds on the path monitoring bursts of information inserted into the virtual paths for path maintenance purposes. Fairness onto the switch fabric is not affected by the inclusion of such path maintenance features.

It will be appreciated that the invention provides the ability of supporting fast and slow scan mechanisms across different logical sections of the switch, in order to optimise the availability bandwidth capacity, whilst preserving availability metrics, on the basis of loading and traffic type.

Although the number of wavelengths, and thus ports of the virtual switch are theoretically unlimited, in a preferred embodiment, this wavelength number is 40 or 80 wavelengths, as routinely found in ITU DWDM compliant networks.

The invention also provides a means of defining the order in which the scanning is to be performed or repeated within a given scan period is provided for in the current invention. By way of example, this scan order may be decided on the basis of the priority and the loading of traffic between ports of the switch.

In another embodiment of the invention the probe wavelength addressed packets, that are replicated at each passive optical splitter in the photonic subsystem, probe other optical paths of the system with periodically deterministically sourced packets, ensuring detection of "silent" failures in such non dataplane paths.

Suitably, such probe packets provide a means of probing the wavelength dependent paths in the collision avoidance subsystem of a wavelength addressed optical burst switch system.

Preferably the probe packets contains a number of fields that contain information pertaining to the type of packet; operations and instrumentation data pertaining to the current or a previously probed virtual path; or provides a means of messaging high priority information, through the data plane, to each distributed switch port. Such a messaging channel allows destination side information (e.g. received optical power, channel bit error rate) to be messaged back to the source allowing source side optimisation of transmitted burst (e.g. increasing transmitted power, or increasing source side pre-chirp of the data burst).

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The invention is not limited to the embodiments hereinbefore described but may be varied in both construction and detail.

The invention claimed is:

1. An optical burst switch in an Optical Burst Switched (OBS) communication network, said optical burst switch comprising:
   means for monitoring and maintaining mesh of virtual optical paths from a communication node to a plurality of other communication nodes, arranged in a ring network, enabling traffic data to be transmitted and/or received between nodes via a physical optical path; and
   means for sending a data packet probe on a virtual path from a node to each other node in the OBS communication network, wherein data packet probe information received at said switch provides information of availability of the physical optical path for sending traffic data between nodes.

2. The optical burst switch of claim 1 wherein the data packet probe is sent using periodic launch and/or reception of high priority asynchronous temporally confined bursts of information.

3. The optical burst switch of claim 1 wherein said probe information is provided at a source side of the virtual switch to allow for source side protection switching.

4. The optical burst switch as claimed in claim 1 wherein the virtual paths are formed by the tuning of wavelengths of a source laser comprising a N×N fully meshed switch formed by such paths.

5. The optical burst switch as claimed in claim 1 wherein physical path monitoring function is in-band with a wavelength addressed optical burst and comprises a monitoring capability along the whole burst path.

6. The optical burst switch as claimed in claim 1 wherein the insertion and filtering of highest priority packets of data are periodically scheduled onto the virtual switch is determined based on data packet probe information.

7. The optical burst switch of claim 1 comprising a second ring network to provide a bi-directional ring topology.

8. The optical burst switch as claimed in claim 1 comprising a second ring network to provide a bi-directional ring topology having:
   means for scheduling highest priority maintenance messages over a distributed optical switching fabric, where the fabric switch is based on tuning the wavelength of a source tunable laser; and
   a protection mechanism based on the lack of reception of such maintenance messages allowing bi-directional path switching to occur within specified time bounds, if a fault is detected on one ring network.

9. The optical burst switch as claimed in claim 1 wherein the switch at each node comprises a view of the full connectivity available to all other nodes in the network for the forwarding of data.

10. The optical burst switch of claim 1 wherein each data packet probe comprises a unique identifier.

11. The optical burst switch of claim 1 wherein the data packet probe comprises at least one parameter of quantitative information of the availability of the physical optical path between nodes before sending data over from one node to another node.

12. The optical burst switch as claimed in claim 1 wherein the data packet probe comprises at least one parameter of quantitative information of the availability of the physical optical path between nodes before sending data over from one node to another node, and wherein the quantitative information comprises one or more of the following parameters: optical received power; Error rate of the physical channel; operations and instrumentation data pertaining to the current or a previously probed virtual path; provides a means of a high priority messaging/"clear" channel in the dataplane.

13. The optical burst switch as claimed in claim 1 wherein said switch comprises a plurality of logical ports, each logical port of the distributed switch receives a virtual path maintenance vector, in a periodic manner, for the switch and means for generating a virtual path maintenance matrix for a full N×N virtual switch, wherein said matrix is a combination of all logical port maintenance vectors.

14. The optical burst switch as claimed in claim 1 wherein said switch comprises a plurality of logical ports, each logical port of the distributed switch receives a virtual path maintenance vector, in a periodic manner, for the switch and means for generating a virtual path maintenance matrix for a full N×N virtual switch, wherein said matrix is a combination of all logical port maintenance vectors, and wherein each maintenance vector comprises a binary connectivity path map between each port and each destination of the switch, as addressed on the basis of source burst wavelength, where each entry is either 0 (no path available) or 1 (path available).

15. The optical burst switch as claimed in claim 1 wherein a physical path monitoring function is in-band with the wavelength addressed optical burst and comprises a monitoring capability along the whole burst path.

16. The optical burst switch as claimed in claim 1 comprising means for providing fair access to each of the virtual paths is maintained by a distributed scheduling system, wherein said scheduling system guarantees delay and jitter bounds on the data packet probes of information inserted into the virtual paths for path maintenance.

17. The optical burst switch as claimed in claim 1 comprising means for defining the order in which the scanning is to be performed by said data packet probes.

18. The optical burst switch as claimed in claim 1 comprising means for defining the order in which the scanning is to be performed by said data packet probes, wherein the scanning order is dependent on the basis of the priority and the loading of traffic between ports of a switch.

19. The optical burst switch as claimed in claim 1 wherein said probe wavelength addressed packets probe other optical paths of the system with periodically deterministically sourced packets, ensuring detection of "silent" failures in such non data plane paths.

20. A method for sending and/or receiving data in an Optical Burst Switched (OBS) optical network comprising the steps of:
    monitoring and maintaining, using a switch controller, mesh of virtual optical paths from a communication node to a plurality of other communication nodes, arranged in a ring network, enabling traffic data to be transmitted and/or received between nodes via a physical optical path; and
    sending, over at least one switch port, a data packet probe on a virtual path from a node to each other node in the OBS communication network, wherein data packet probe information received at a switch provides information of availability of the physical optical path for sending traffic data between nodes.

21. A computer program encoded on a non-transitory computer-readable medium comprising program instructions for causing a computer to perform a method for sending and/or receiving data in an Optical Burst Switched (OBS) optical network comprising the steps of:
    monitoring and maintaining mesh of virtual optical paths from a communication node to a plurality of other communication nodes, arranged in a ring network, enabling traffic data to be transmitted and/or received between nodes via a physical optical path; and
    sending a data packet probe on a virtual path from a node to each other node in the OBS communication network, wherein data packet probe information received at a switch provides information of availability of the physical optical path for sending traffic data between nodes.

22. An optical burst switch in an Optical Burst Switched (OBS) communication network, said optical burst switch comprising:
    a switch controller configured to monitor and maintain mesh of virtual optical paths from a communication node to a plurality of other communication nodes, arranged in a ring network, enabling traffic data to be transmitted and/or received between nodes via a physical optical path; and
    a path monitor source configured to send a data packet probe on a virtual path from a node to each other node in the OBS communication network, and a path monitor receiver configured to receive data packet probe information and to determine information of availability of the physical optical path for sending traffic data between nodes.

* * * * *